(12) United States Patent
Rothman et al.

(10) Patent No.: US 7,788,460 B2
(45) Date of Patent: Aug. 31, 2010

(54) DEFRAGMENTING OBJECTS IN A STORAGE MEDIUM

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 10/823,895

(22) Filed: Apr. 13, 2004

(65) Prior Publication Data

US 2005/0228963 A1 Oct. 13, 2005

(51) Int. Cl.
*G06F 12/02* (2006.01)

(52) U.S. Cl. .................. 711/170; 711/101; 711/165

(58) Field of Classification Search .......... 711/101, 711/165, 170
See application file for complete search history.

(56) References Cited

U.S. PATENT DOCUMENTS

| 5,339,449 | A | * | 8/1994 | Karger et al. | 710/6 |
| 5,706,472 | A | * | 1/1998 | Ruff et al. | 711/173 |
| 6,038,636 | A | * | 3/2000 | Brown et al. | 711/103 |
| 6,253,300 | B1 | * | 6/2001 | Lawrence et al. | 711/173 |
| 2004/0059863 | A1 | * | 3/2004 | Andrew et al. | 711/1 |
| 2005/0108075 | A1 | * | 5/2005 | Douglis et al. | 705/8 |
| 2005/0162944 | A1 | * | 7/2005 | Ball et al. | 365/200 |

OTHER PUBLICATIONS

Russinovich, M. "Inside Windows NT Disk Defragmenting," URL:http://www.winntmag.com/Articles/Print. cfm?ArticleID=304; May 1997; 5 pp.
"Defragmenting Files," URL:http://msdn.microsoft.com/library/en-us/fileio/base/defragmenting_files.asp?frame=true; 2004; 2 pp.
"Disk Defragmenter in Windows 2000: Maintaining Peak Performance Through Defragmentation," URL:http://www.microsoft.com/windows2000/techinfo/administration/fileandprint/defrag.asp; Feb. 2001; 7 pp.

* cited by examiner

*Primary Examiner*—Sanjiv Shah
*Assistant Examiner*—Jae U Yu
(74) *Attorney, Agent, or Firm*—Konrad Raynes & Victor LLP; David W. Victor

(57) ABSTRACT

Provided are a method, system and program for defragmenting objects in a storage medium. An I/O request to an object in storage is received and the object is defragmented in storage so that blocks in storage including the object are contiguous in response to receiving the I/O request. The I/O request is executed with respect to the object in storage.

21 Claims, 3 Drawing Sheets

DEFRAGMENTING OBJECTS IN A STORAGE MEDIUM

BACKGROUND

When an object, such as a file, program, folder, directory, etc., is initially written to a storage medium, such as a hard disk drive, the data is written to sequential blocks or bytes. However, as files, folders, programs, etc. are deleted, added, and moved to the storage medium, the storage controller may write the objects to non-contiguous blocks. For instance, when objects are deleted, the empty spaces left on the disk are subsequently filled with new objects. If contiguous empty space is not sufficient to store a new object, then the remainder of the object is written to a next available space in the storage medium, which may be non-contiguous to the space on the disk storing other parts of the object.

A file stored in non-contiguous locations on a disk is referred to as "fragmented". File fragmentation has a negative impact on disk performance because the disk head must spend time seeking and moving to different non-contiguous locations to access all bytes of a requested file.

To address the problem of defragmentation, the Microsoft® Windows® operating system includes a disk defragmenter utility that a user invokes to defragment all files on a disk or logical partition. (Microsoft and Windows are registered trademarks of Microsoft Corporation). The defragmentation utility may run for many hours to defragment all files on a disk or partition having several gigabytes of data. Moreover, many computer users may not have knowledge of the defragmentation utility to use to optimize disk performance. Further, many users may be discouraged from running the utility because of the time needed to defragment a drive. Yet further, running the defragmentation utility requires substantial computational resources and can substantially degrade the performance of other programs the user is concurrently running.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
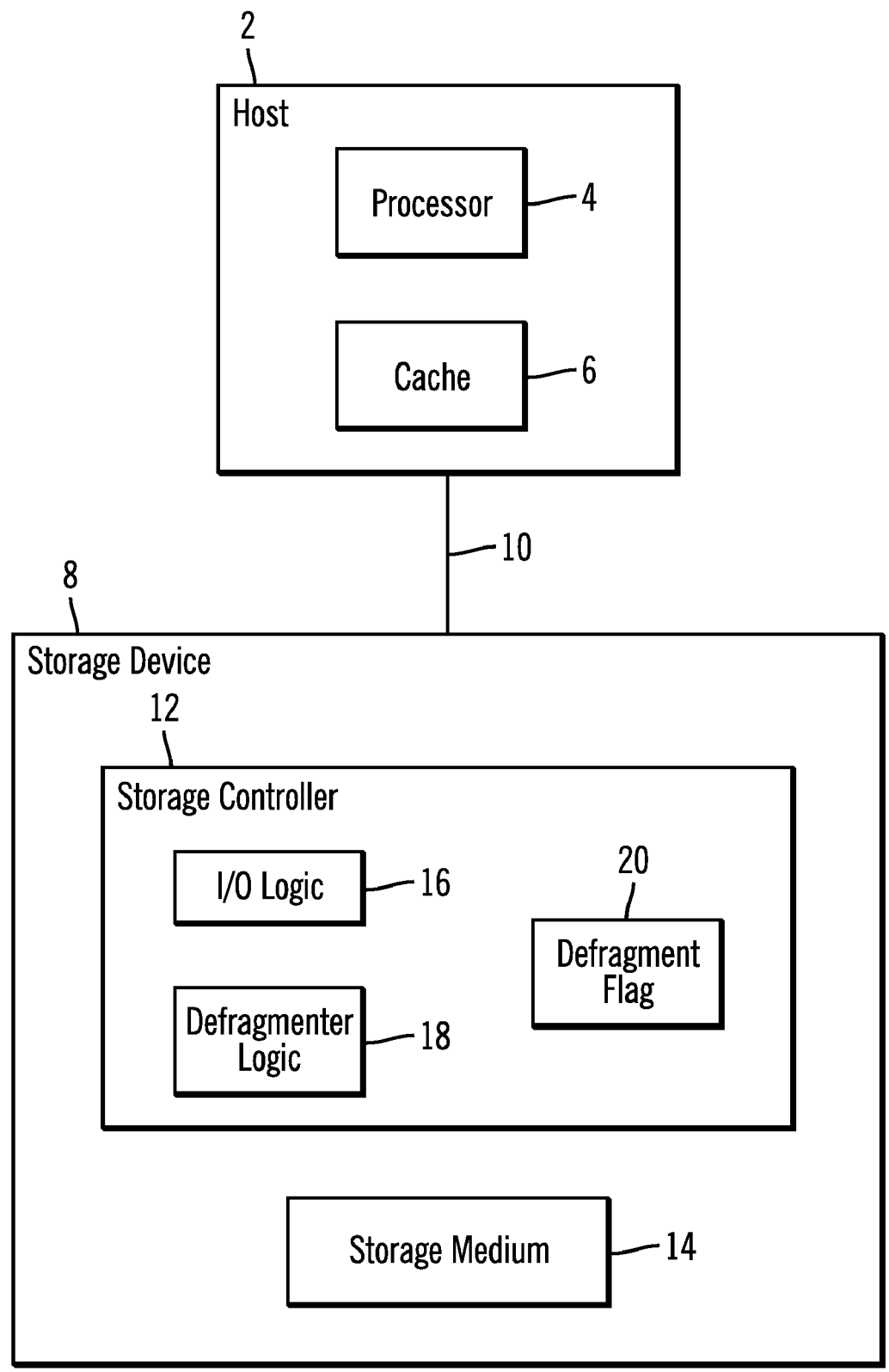
FIGS. 1 and 3 illustrate computing environments.

FIG. 1 illustrates a storage environment used with the described embodiments. A host system 2 includes a processor 4 and a cache 6 in which received data is stored. The host processor 4 forwards I/O requests to a storage device 8 over an interface 10. The cache 6 may buffer I/O requests before they are forwarded to the storage device 8. The storage controller 8 manages the storage and access of data in a storage medium 12. In certain embodiments, the interface 10 may comprise a bus interface, such as a Peripheral Component Interconnect (PCI) interface, Small Computer System Interface (SCSI), Serial Attached SCSI (SAS), and other bus interfaces known in the art. PCI is described in the publication "PCI Local Bus Specification", Rev. 2.3 (March 2002), published by the PCI Special Interest Group; SCSI is described in the publication; SCSI is described in the publication "SCSI Architecture Model-3 (SAM 3)", published by ANSI, T10, Project 1561-D (March 2004); and SATA is described in the publication "Serial ATA: High Speed Serialized AT Attachment", Rev. 1.0a (January 2003). Alternatively, the interface 10 may comprise a network connection to connect over a network, such as a Local Area Network (LAN), Wide Area Network (WAN), Storage Area Network (SAN), etc.

The storage device 8 includes a storage controller 12 that manages I/O requests to a storage medium 14. The storage medium 14 may comprise a magnetic storage media, such as the case if the storage device 8 comprises a hard disk drive, tape drive, etc. In alternative embodiments, the storage controller may be located external to the storage device and manage a plurality of storage devices, such as disk drives, as a single storage entity, where the storage controller manages the devices as a Redundant Array of Independent Disks (RAID) array, Just a Bunch of Disks (JBOD), Direct Access Storage Device (DASD), etc.

The storage controller 12 includes I/O logic 16 to manage I/O requests to the storage medium 14. Upon detecting an I/O request to an object in the storage medium 14, where the object may comprise a file, program, directory, folder or other data structures known in the art, the I/O logic 16 would invoke defragmenter logic 18 to defragment the object in the storage medium 14. A user settable defragment flag 20 indicates whether defragmenter logic 18 should be invoked or whether the I/O request is executed against the object in the storage medium 14 without performing defragmentation. With this flag 20, a user may selectively disable or enable the defragmenter logic 18.

In embodiments where the interface 10 is a bus interface, the storage device 12 may be in the same housing as the host 2, such as the case with a hard disk drive within a computer. Alternatively, the storage device 12 may be in a separate housing from the host 2, especially in embodiments when the interface 10 comprises a network connection. Yet further, the storage controller 12 may be external to the storage device and within the host 2 and manage I/O requests to the storage device, which may be one of many interconnected storage devices. For instance, the storage controller may be implemented in an expansion card within an expansion slot of the host 2 motherboard or backplane that is connected to the storage device, which may be located external or internal to the host 2. Alternatively, the storage controller may be external to the storage device and implemented as an integrated circuit component coupled directly to the host 2 motherboard.

Figure 2:
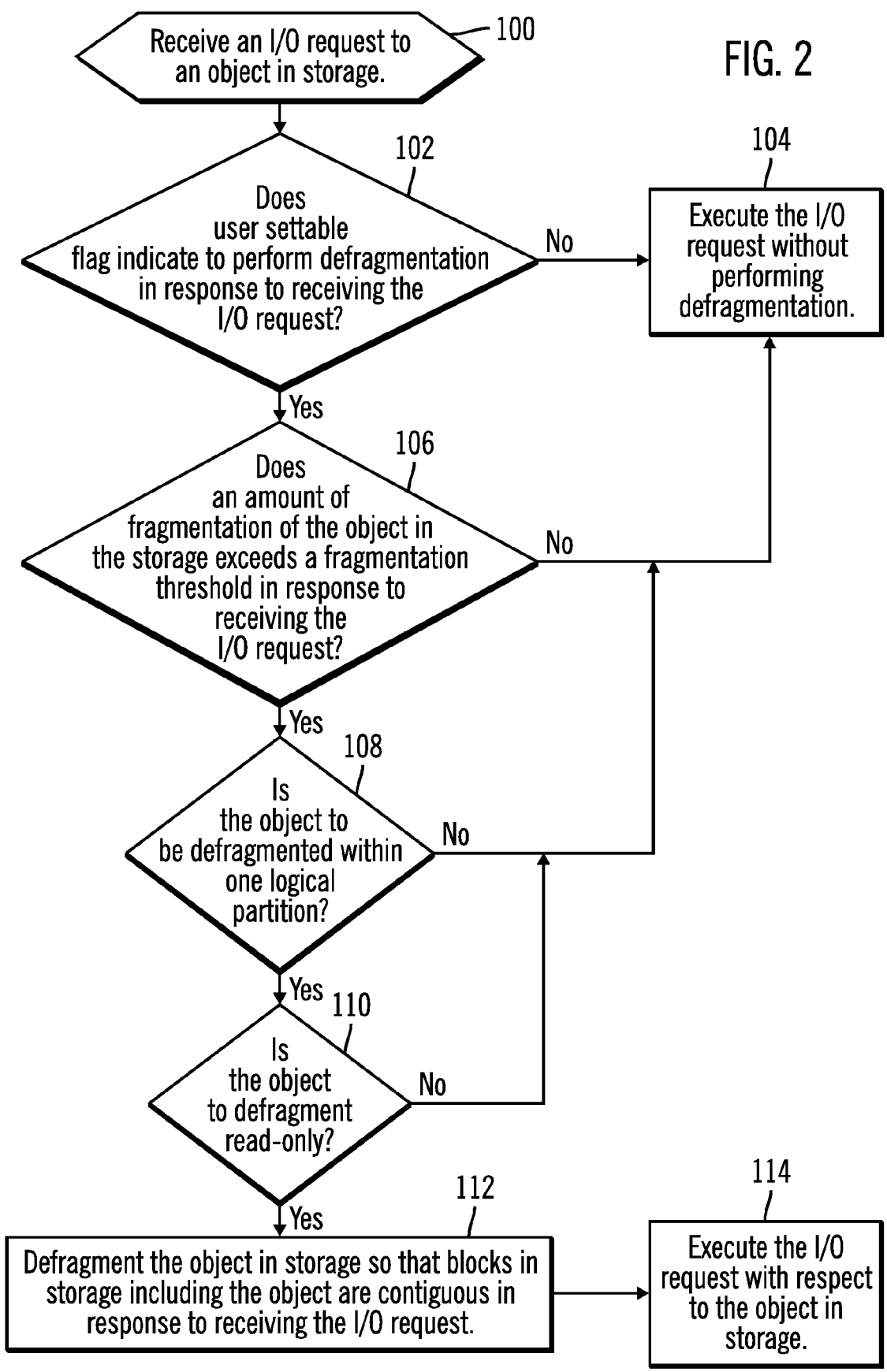
FIG. 2 illustrates operations to migrate data.

FIG. 2 illustrates defragmentation operations in accordance with the described embodiments. The operations of FIG. 2 may be implemented in the I/O logic 16 and defragmenter logic 18. Upon receiving (at block 100) an I/O request to a target object in the storage medium 14, a determination is made of whether the user settable flag, such as the defragment flag 20, indicates to perform defragmentation in response to receiving the I/O request. In certain embodiments, the I/O logic 16 may check the defragment flag 20 to determine whether to invoke the defragmenter logic 18. If the user settable flag 20 indicates to perform defragmentation, then a series of checks are made at blocks 106 through 110 to determine whether to perform the fragmentation or execute the request against the object in the storage medium 14 without defragmenting the object in the storage medium 14. These checks may be performed by the I/O logic 16 or defragmenter logic 18. In FIG. 2 each of the conditions checked at blocks 106-110 must be satisfied as a precondition for performing the defragmentation operation. In alternative embodiments, any one or more of these conditions may need to be satisfied as a condition for performing the defragmentation operation.

If the user settable flag 20 is not set, then control proceeds to block 104 to execute the I/O request without performing defragmentation.

If (at block 102) the defragment flag 20 is set, then a determination is made (at block 106) of whether an amount of fragmentation of the object in the storage exceeds a fragmentation threshold. The amount of fragmentation may comprise a percentage of the object that is not stored at contiguous locations. For instance, if the object is comprised of three bytes and two bytes are contiguous and another byte non-contiguous than the amount of fragmentation comprises one-third. Alternatively, the amount may comprise a number of bytes that are stored in non-contiguous locations with respect to other bytes in the object. The threshold may comprise any predetermined acceptable level of fragmentation. Alternatively, the threshold may comprise any amount of fragmentation, such that this condition is satisfied if the object has any degree of fragmentation. If (at block 106) the amount of fragmentation exceeds the fragmentation threshold, then the I/O request is executed (at block 104) without performing defragmentation.

The check at block 108 determines whether the target object subject to the I/O request is within one logical partition. If not, then control proceeds to block 104 to execute the request without performing defragmentation. The storage controller 12 may read the master boot record during initialization to determine the configuration of the storage medium 14, such as the format of the data, e.g., File Allocation Table (FAT) file system, NT File System (NTFS), etc., and the mapping of logical block addresses to different partitions. The storage controller 12 uses this information to locate data in logical partitions in the storage medium 14. In certain embodiments, defragmentation is only performed with respect to objects that are within a single partition and that do not span partitions.

The check at block 110 determines whether the target object is read-only. If so, then control proceeds to block 104 to process the I/O request.

If each of the check conditions at 102, 106, 108, and 110 are satisfied, then the defragmenter logic 18 defragments (at block 112) the object in storage 14 so that blocks in storage 14 including the object are contiguous in response to receiving the I/O request. The I/O request is executed (at block 114) with respect to the object in storage.

In certain embodiments, the I/O request against the object is executed after the object is defragmented. In this way, if there is a failure during the defragmentation, then complete is not returned to the I/O request to update the object and data will not be lost if failure occurs during the defragmentation. In alternative embodiments, the defragmentation may occur after an update is written to an object.

Figure 3:
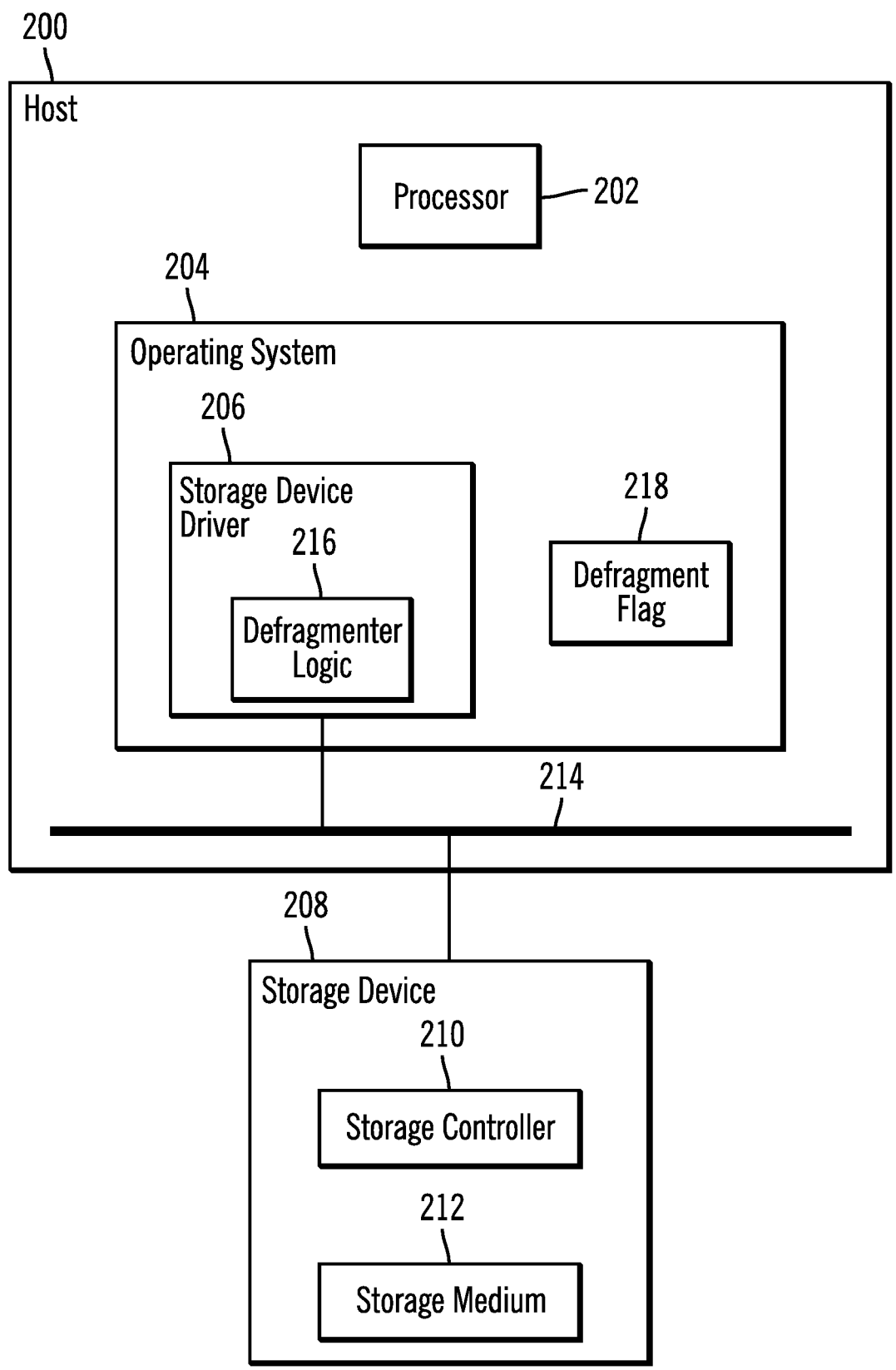

FIG. 3 illustrates an alternative architecture in which described embodiments operate. A host system 200 includes a processor 202 and an operating system 204 having a storage device driver 206 to provide an interface between the operating system 204 and a storage device 208, having a storage controller 210 and storage media 212. The storage device driver 206 communicates with the storage device 208 over a bus interface 214. Further, the storage device driver 206 includes deframenter logic 216 and defragment flag 218 to defragment objects in the storage media 212 in response to an I/O request for one object in the manner discussed above with respect to FIG. 2.

Described embodiments provide techniques to defragment objects in storage in a manner that maintains defragmentation with minimal burdens on the host processor resources by defragmenting objects as they are subject to I/O requests.

Further, in embodiments that locate the defragmenter logic within the storage controller, which may be external or internal to the disk drive, the defragmentation operations are offloaded from the host processor to the storage controller thereby improving the performance of the host processor.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The illustrated operations of FIG. 2 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving an I/O request to write an update to an object in storage;

determining whether an amount of fragmentation of the object in the storage exceeds a fragmentation threshold indicating an acceptable number of bytes stored in non-contiguous locations in response to receiving the I/O request;

determining at least one logical partition including the object;

determining whether the object is read-only;

if the object is not read-only and if the object is within one logical partition, defragmenting the object in the storage so that blocks in the storage including the object are contiguous in response to receiving the I/O request to write the update to the object, wherein the request to write the update to the object causes the defragmentation operation; and executing the I/O request to write the update to the object in the storage without defragmenting the object in response to determining at least one of that the object is included in more than one logical partition, that the object is read-only, and that the amount of fragmentation does not exceed the fragmentation threshold.

2. The method of claim 1, wherein the I/O request is executed with respect to the object after defragmenting the object.

3. The method of claim 1, further comprising:

determining whether a user settable flag indicates to perform defragmentation in response to receiving the I/O request, wherein the object is defragmented if the flag indicates to perform defragmentation.

4. The method of claim 3, further comprising:

executing the I/O request without performing defragmentation if the flag does not indicate to perform defragmentation.

5. The method of claim 1, wherein the operations of receiving the I/O request, initiating the operation to defragment the object, and executing the I/O request of defragmenting the object in the storage are performed by a storage controller managing I/O requests to the storage.

6. The method of claim 1, wherein the operation of defragmenting the object in the storage is performed by a device driver for the storage providing an interface to the storage.

7. A system in communication with storage, comprising:
circuitry enabled to:

receive an I/O request to write an update to an object in the storage;

determining whether an amount of fragmentation of the object in the storage exceeds a fragmentation threshold indicating an acceptable number of bytes stored in non-contiguous locations in response to receiving the I/O request;

determining at least one logical partition including the object;

determining whether the object is read-only;

if the object is not read-only and if the object is within one logical partition, defragment the object in the storage so that blocks in the storage including the object are contiguous in response to receiving the I/O request to write the update to the object, wherein the request to write the update to the object causes the defragmentation operation; and execute the I/O request to write the update to the object in the storage without defragmenting the object in response to determining at least one of that the object is included in more than one logical partition, that the object is read-only, and that the amount of fragmentation does not exceed the fragmentation threshold.

8. The system of claim 7, wherein the I/O request is executed with respect to the object after defragmenting the object.

9. The system of claim 7, wherein the circuitry is further enabled to: determine whether a user settable flag indicates to perform defragmentation in response to receiving the I/O request, wherein the object is defragmented if the flag indicates to perform defragmentation.

10. The system of claim 9, wherein the circuitry is further enabled to: execute the I/O request without performing defragmentation if the flag does not indicate to perform defragmentation.

11. The system of claim 7, wherein the circuitry is implemented in a storage controller managing I/O requests to the storage, wherein the operations of receiving the I/O request, initiating the operation to defragment the object, and executing the I/O request of defragmenting the object in the storage are performed by the storage controller.

12. The system of claim 7, wherein the circuitry is implemented in a device driver interfacing between an operating system and the storage, and wherein the operation of defragmenting the object in the storage is performed by the device driver.

13. A system, comprising:

storage;

a storage controller coupled to the storage, wherein the storage controller is enabled to:

receive an I/O request to write an update to an object in the storage;

determining whether an amount of fragmentation of the object in the storage exceeds a fragmentation threshold indicating an acceptable number of bytes stored in non-contiguous locations in response to receiving the I/O request;

determining at least one logical partition including the object;

determining whether the object is read-only;

if the object is not read-only and if the object is within one logical partition, defragment the object in the storage so that blocks in the storage including the object are contiguous in response to receiving the I/O request to write the update to the object, wherein the request to write the update to the object causes the defragmentation operation; and execute the I/O request to write the update to the object in the storage without defragmenting the object in response to determining at least one of that the object is included in more than one logical partition, that the object is read-only, and that the amount of fragmentation does not exceed the fragmentation threshold.

14. The system of claim 13, wherein the storage controller and the storage are included in a same housing.

15. The system of claim 13, further comprising:

a processor; and a memory enabled to store the I/O request before the I/O request is received by the storage controller.

16. An article of manufacture comprising at least one of a computer readable storage medium having code executed by a processor and a hardware device having logic to communicate with a storage and perform operations, the operations comprising:

receive an I/O request to write an update to an object in the storage;

determining whether an amount of fragmentation of the object in the storage exceeds a fragmentation threshold indicating an acceptable number of bytes stored in non-contiguous locations in response to receiving the I/O request;

determining at least one logical partition including the object;

determining whether the object is read-only;

if the object is not read-only and if the object is within one logical partition, defragment the object in the storage so that blocks in the storage including the object are contiguous in response to receiving the I/O request to write the update to the object, wherein the request to write the update to the object causes the defragmentation operation; and execute the I/O request to write the update to the object in the storage without defragmenting the object in response to determining at least one of that the object is included in more than one logical partition, that the object is read-only, and that the amount of fragmentation does not exceed the fragmentation threshold.

17. The article of manufacture of claim 16, wherein the I/O request is executed with respect to the object after defragmenting the object.

18. The article of manufacture of claim 16 further enabled to:

determine whether a user settable flag indicates to perform defragmentation in response to receiving the I/O request, wherein the object is defragmented if the flag indicates to perform defragmentation.

19. The article of manufacture of claim 18 further enabled to:

execute the I/O request without performing defragmentation if the flag does not indicate to perform defragmentation.

20. The article of manufacture of claim 16 wherein the operation of defragmenting the object in the storage is performed by a storage controller managing I/O requests to the storage.

21. The article of manufacture of claim 16, wherein the operations of receiving the I/O request, initiating the operation to defragment the object, and executing the I/O request of defragmenting the object in the storage are performed by a device driver for the storage providing an interface to the storage.

* * * * *